(12) United States Patent
Riddel et al.

(10) Patent No.: US 9,989,836 B1
(45) Date of Patent: Jun. 5, 2018

(54) OPTICAL MOUNTING DEVICE

(71) Applicants: Charles Stephen Riddel, Austin, TX (US); Jacob Daniel Riddel, Humble, TX (US)

(72) Inventors: Charles Stephen Riddel, Austin, TX (US); Jacob Daniel Riddel, Humble, TX (US)

( * ) Notice: Subject to any disclaimer, the term of this patent is extended or adjusted under 35 U.S.C. 154(b) by 0 days. days.

(21) Appl. No.: 15/654,437

(22) Filed: Jul. 19, 2017

Related U.S. Application Data

(60) Provisional application No. 62/364,226, filed on Jul. 19, 2016.

(51) Int. Cl.
G03B 17/00 (2006.01)
G03B 17/56 (2006.01)
F16M 11/12 (2006.01)

(52) U.S. Cl.
CPC .......... *G03B 17/561* (2013.01); *F16M 11/12* (2013.01); *G03B 17/563* (2013.01); *F16M 2200/022* (2013.01)

(58) Field of Classification Search
USPC .......................... 396/419, 425, 428; 348/373
See application file for complete search history.

(56) References Cited

U.S. PATENT DOCUMENTS

| 2,326,657 | A | * | 8/1943 | Johnston | F16M 11/18 248/184.1 |
| 3,822,769 | A | * | 7/1974 | O'Connor | F16D 33/00 188/290 |
| 4,234,149 | A | * | 11/1980 | Kawazoe | F16M 11/10 248/184.1 |
| 4,249,817 | A | * | 2/1981 | Blau | F16M 11/08 248/183.2 |
| 4,648,698 | A | * | 3/1987 | Iwasaki | F16M 11/105 248/163.1 |
| 4,736,217 | A | * | 4/1988 | McDowell | F16M 11/105 396/428 |
| 5,267,712 | A | * | 12/1993 | Shen | F16M 11/105 248/179.1 |
| 5,737,657 | A | * | 4/1998 | Paddock | F16M 11/041 248/187.1 |
| 7,180,547 | B2 | * | 2/2007 | Wei | H04N 5/225 348/375 |
| 2004/0223078 | A1 | * | 11/2004 | Zadok | F16M 13/04 348/375 |
| 2005/0041966 | A1 | * | 2/2005 | Johnson | F16M 11/041 396/428 |
| 2005/0196162 | A1 | * | 9/2005 | Mootz | F16M 11/041 396/428 |

(Continued)

*Primary Examiner* — Rodney Fuller
(74) *Attorney, Agent, or Firm* — Law Office of Jeff Williams; J. Oliver Williams

(57) ABSTRACT

An optical mounting device is disclosed that enables an optical device to be pointed in the desired orientation with minimal effort between a horizontal and a vertical position. The device includes a yoke, a saddle, and a payload platform assembly. The device can lock the position of the optical device into a desired orientation. The payload platform assembly has a lower base that is coupled to the saddle and an extendable upper section attached to a rotation pivot guide that allows the upper section to rotate up to 90 degrees from horizontal landscape orientation to a vertical portrait orientation.

11 Claims, 5 Drawing Sheets

(56) References Cited

U.S. PATENT DOCUMENTS

| | | | |
|---|---|---|---|
| 2006/0239677 A1* | 10/2006 | Friedrich | F16M 11/043 396/419 |
| 2009/0263118 A1* | 10/2009 | McKay | G03B 17/00 396/421 |
| 2010/0310250 A1* | 12/2010 | McAnulty | F16M 11/041 396/428 |
| 2011/0069472 A1* | 3/2011 | Peregrine | G03B 15/02 362/11 |

* cited by examiner

OPTICAL MOUNTING DEVICE

CLAIM OF PRIORITY

This application claims the benefit of U.S. Provisional Application No. 62/364,226, filed 19 Jul. 2016. The information contained therein is hereby incorporated by reference.

BACKGROUND

1. Field of the Invention

The present application relates to optical equipment, and more particularly to an optical mounting device.

2. Description of Related Art

Existing gimbal mounts tend to be heavy and bulky. These are used to secure an optical instrument to a stand. They may be configured to provide some degrees of motion and operate to assist in controlling and stabilizing the optical instrument. However, existing gimbal mounts have some disadvantages. They typically limit the range of up/down rotation and fail to accommodate wide instrument loads in an acceptable manner. Generally, such gimbal mounts also fail to provide a steering mechanism for short instruments. Additional limitations include cumbersome clutch adjustments; failure to provide for portrait mode photography; and depend on long quick-plates for fore/aft balance adjustments.

In an effort to maintain balancing, existing gimbal mounts usually need long quick-plates to provide offset. For example, if the center of mass of the optical instrument is not centered approximately over the clamp, the quick-pate must be long enough to provide the offset needed to achieve fore/aft balance. While this may seem good, long quick-plates tend to introduce flexure and vibration into the assembly which can affect picture quality. Furthermore, this flexure and vibration can lead to dislodging of the optical instrument from the clamping device.

Another important factor in guiding optical instruments simultaneously in both rotation axes is the ability to equalize the rotation forces on the two axes. The knob controls on existing gimbal mounts are difficult to adjust quickly and are not precise.

When using optical instruments such as telescopes, cameras, binoculars, or spotting scopes, it is desirable to be able to easily move the optical instrument to point at different objects, as well as smoothly follow the motions of objects, while also being able to lock position on specific objects. In addition, with cameras in particular, it desirable to be able to rotate the camera from a horizontal or landscape orientation, to a vertical or portrait orientation. It is also desirable to be able to quickly and easily be able to attach and remove the optical instrument from the mount.

Although strides have been made to increase the functionality of conventional optic mounts, considerable shortcomings remain. Embodiments of the present application address these shortcomings.

SUMMARY OF THE INVENTION

An optical mounting device comprises a yoke assembly; a saddle coupled to the yoke assembly; a lever coupled to the yoke assembly for moving the saddle in altitude and azimuth axes; and a payload platform assembly mounted to the saddle. The payload platform assembly includes a lower base that is coupled to the saddle and an extendable upper section attached to a rotation pivot guide that allows the upper section to rotate 90 degrees from horizontal landscape orientation to a vertical portrait orientation.

It is an object of the present application to provide an optical mounting device configured to equalize rotation forces on the horizontal and vertical axes in a manner that incorporates precise adjustable clamping forces and simplified controls for quick operation.

It is another object of the present application to provide an optical mounting device configured to provide a method and configuration that permits balancing of the optical instrument about the axes while minimizing flexure and vibration. It is desired that the use of long quick-plates is unnecessary. The configuration of the optical mounting device allows location adjustment of the optical instrument in a plurality of directions to ensure proper balance. Removal of the long quick-plates minimizes flexure and vibration to help ensure better viewing quality.

It is another object of the present application to provide for better control and functionality of the optical instrument when in use. The optical mounting device of the present application is configured to enhance control of short instruments as well as allow rotation of the optical instrument between both portrait and landscape orientations.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
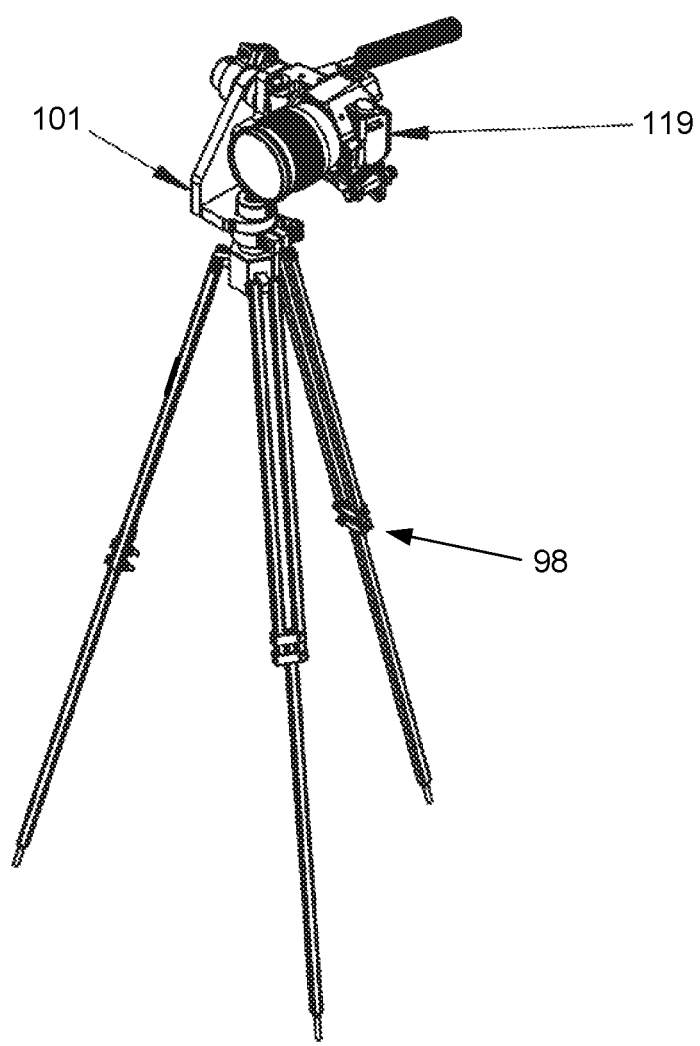
FIG. 1 is a top perspective view of an optical mounting device according to an embodiment of the present application.

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The device and method in accordance with the present application overcomes one or more of the above-discussed problems commonly associated with traditional optic mounting devices. In particular, the optical mounting device is configured to equalize rotation forces on the horizontal and vertical axes in a manner that incorporates precise adjustable clamping forces and simplified controls for quick operation. The device is further configured to provide a method and configuration that permits balancing of the optical instrument about the axes while minimizing flexure and vibration. Additionally, the device is configured to provide for better control and functionality of the optical instrument when in use wherein it enables an optical instrument, such as a camera, to be pointed in a desired orientation with minimal effort. Furthermore, the optic mounting device of the present application has the ability to lock onto a desired orientation. These and other unique features of the device are discussed below and illustrated in the accompanying drawings.

The device and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The device and method of the present application is illustrated in the associated drawings. In a general overview of the Figures, embodiments of the subject technology provide an optical mounting device 101 that enables an optical instrument 119 to be pointed in the desired orientation with minimal effort, as well as the ability to lock onto a desired orientation. Embodiments herein disclosed eliminate dependence on long quick-plates for two axis balancing. Additionally, lever operated clutches 122 allow for easy and precise control of axis rotations. The platform assembly allows a camera to be tilted from landscape to portrait modes in such a way that the balance of the optical instrument load around the altitude axis is unchanged. Camera rotation is accomplished with a compact, lightweight, built-in device. A compound clamping lever opens sufficiently for easy installation and removal of a quick-plate while also providing a high mechanical advantage for a secure connection to the quick-plate. The range of vertical rotation for most optical instruments is extended to include straight-down or straight-up. Short optical instruments are made more controllable by addition of a guide-handle.

A two-degree freedom of balancing system allows the center of gravity of the optic to be aligned along the horizontal (altitude) axis of rotation so that gravity does not produce a net torque on the optic, regardless of its orientation. This allows the axes to have very little holding friction to maintain position, and very little force is required to guide the optic. Furthermore, the holding friction is controlled by an adjustable lever, allowing the user to quickly and easily set the holding torque to the desired level, and can also lock the optic's orientation in place with the lever. The lever-operated controls equalize the rotation forces between the two axes, which is especially important for following objects moving along oblique paths. Additional features and functions of the device are illustrated and discussed below.

Referring now to the drawings wherein like reference characters identify corresponding or similar elements in form and function throughout the several views. Referring now to FIG. 1 in the drawings, a perspective view of an optical mounting device according to an embodiment of the present application is illustrated. Optical mounting device 101 is shown in communication with an optical instrument 119, shown as a camera, and a stand 98. Device 101 is operable in association with any number of optical instruments, such as telescopes, cameras, binoculars, or spotting scopes for example. Device 101 is configured to provide a platform for supporting optical instrument 119 so as to allow movement for balancing purposes, rotation about a plurality of axes, functional operation between landscape and portrait views, and improved steering controls, among other features described herein. It is understood that device 101 may be used also with varied types of stands 98 and that such stand is not herein meant to be limiting.

Figure 2:
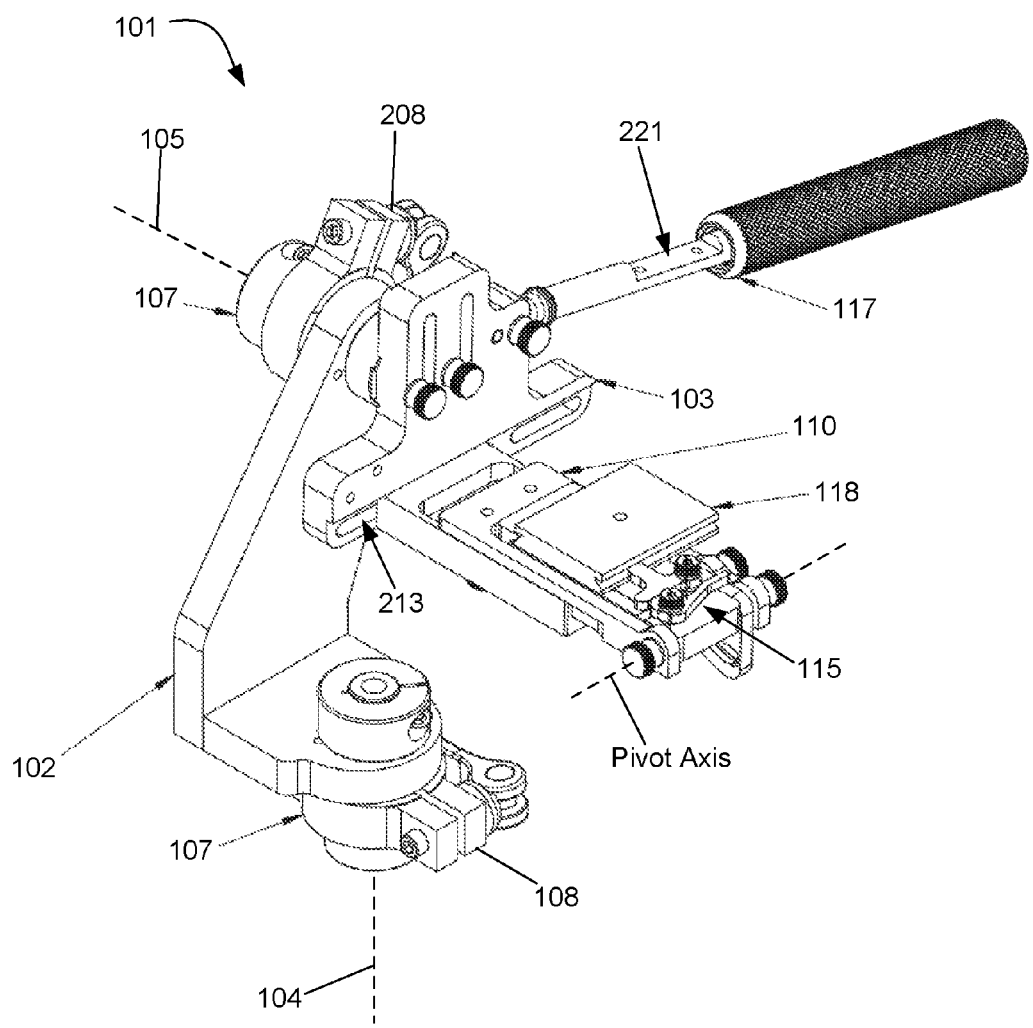
FIG. 2 is an enlarged perspective view of the optical mounting device of FIG. 1.

Referring now also to FIG. 2 in the drawings, an enlarged perspective view of the optical mounting device 101 is illustrated. Mounting device 101 includes a payload platform assembly 110, a yoke 102, a saddle 103, and a guide handle 117. Yoke 102 is configured to couple to stand 98. The yoke assembly 102 provides an L shaped structure with to which the altitude axis 105 and azimuth axis 104 are coupled at precisely 90 degree orientations. The yoke assembly 102 forms the outer structure of the device 101 is canted backwards, towards the user so that optical instruments having some appreciable length can be rotated directly upward without bumping the mount structure. The attachment point of the optical instrument 119 is shifted slightly to the left side of the payload platform, allowing optical instruments with appreciable length to be rotated directly downward. It should be understood that FIG. 2 is predominantly oriented so as to show the front side of device 101. Therefore handle 117 extends toward the rear.

Figure 4:
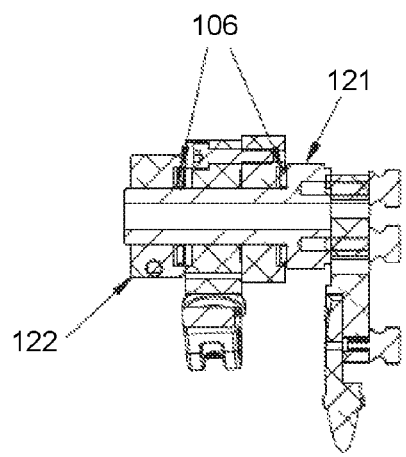
FIG. 4 is a cross-sectional view taken along line A-A of FIG. 3.
Figure 3:
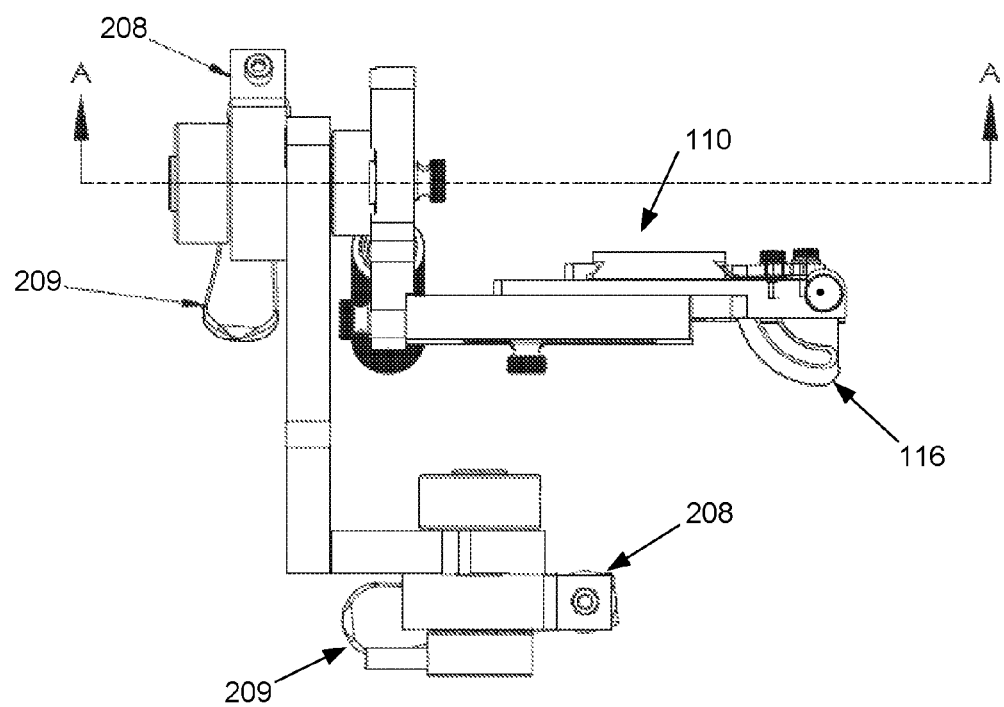
FIG. 3 is a front view of the optical mounting device of FIG. 2.

Referring now also to FIGS. 3 and 4 in the drawings, a front view of the optical mounting device 101 of FIG. 2 is illustrated along with a section view of FIG. 3. Friction control assemblies 107 (refer also to 108 and 208) are rigidly attached to the yoke assembly 102 and are used to permit the selective rotation of yoke 102 and saddle 103 about the axes 104 and 105. The friction control assemblies use friction collars 108 and 208 as a means of adjusting the level of friction. Friction collars 108 and 208 are concentric with the axes 104 and 105 respectively. Friction collars 108 and 208 are used in place of the traditional disc clutches, providing smoother transitions between static and kinetic friction, as well as providing easy lever adjustments. The friction collars 108 and 208 have two tangs (see FIG. 3 also) coupled to the friction control lever 109 and 209. Collars 108 and 208 are configured to provide a compressive force that creates an adjustable holding torque about each respective axis.

The vertical azimuth axis 104 can be attached to a tripod or other user supplied base. Preloaded thrust bearings 106 (see FIG. 4) on the axes 104 and 105 allow free rotation with the only appreciable holding torque being provided by the friction control assemblies. The preload in the bearings 106 allows the axes 104 and 105 to support torsional load in an axis perpendicular to the axis of rotation without significant added friction, or binding. Bearings 106 are in communication with the axis shaft 121. Clutch 122 is configured to communicate with shaft 121 in providing friction control. Clutch 122 is operable with control lever 209 of collar 208. Friction collar 108 is similar in form and function to that of friction collar 208, also including similar bearings, axis shaft, and clutch.

Saddle 103 is coupled to yoke 102 along the horizontal altitude axis 105. Saddle 103 is configured to permit translation of payload platform assembly 110 in a vertical direction and horizontal direction so as to align the optical instrument center of mass with each axis. Doing so allows the vertical alignment of the saddle 103 to be adjusted so as to move the center of mass of the optical instrument 119 to be vertically aligned with the axis of rotation 105. Saddle 103 is also configured to permit translation of payload platform assembly 110 in a horizontal direction. Assembly 110 may be raised and lowered via one or more vertical slots in saddle 103 and secured via interference fit from one or more knobs. Use of slots permits infinite control of positioning assembly 110.

The payload platform assembly 110 is coupled to the saddle 103 such that the horizontal position (forward and backward) is adjustable so as to move the center of mass of the optical instrument 119 to be horizontally aligned with the axis rotation. Saddle 103 includes slot 213 for acceptance of assembly 110. A threaded knob on a reverse side of saddle 103 (see FIG. 3) is configured to secure assembly 110 at a desired forward and rearward position via interference fit and/or threaded communication with assembly 110. Use of slots permits infinite control of positioning assembly 110.

Figure 5:
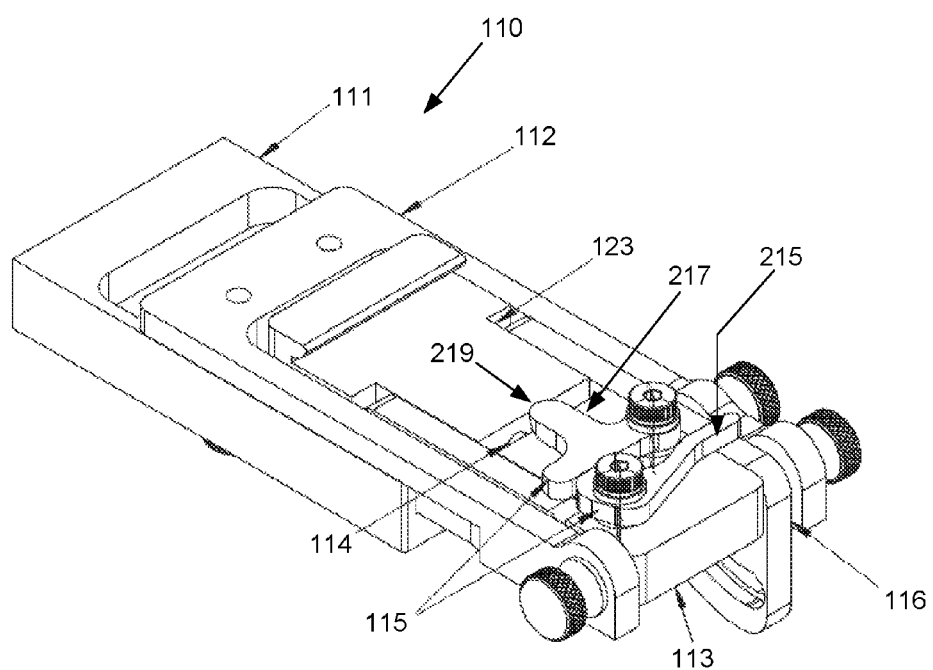
FIG. 5 is an enlarged perspective view of a platform of the optical mounting device of FIG. 2 according to an embodiment of the present application.

Referring now also to FIG. 5 in the drawings, an enlarged perspective view of platform assembly 110 is illustrated. Payload platform assembly 110 also includes a rotatable dovetail mounting plate 118 that is releasably secured within an inner platform clamp 123. The extensible and adjustable payload platform assembly 110 can handle optical instruments with very different configurations. The platform assembly 110 to which the optical instrument is attached incorporates a compound clamping mechanism 115 that allow for quick installation, removal, and adjustment of commercially available dovetail plates (sometimes called quick-plates). The quick-plate compound clamping mechanism 115 provides a large range of motion for easy installation of the optical instrument, while also offering a large mechanical advantage for secure clamping.

The assembly 110 includes a compound lever configuration having an outer lever 215 and an inner lever 217. The outer lever 215, which is operated by the user, couples via a cam to the inner lever. The cam is designed such that during the clamping process the initial motion produces a large displacement of the inner lever 217, allowing the dovetail plate 118 to be easily inserted or removed when the device is open. The last increment of the lever motion produces a small displacement of the inner lever 217, generating a large mechanical advantage for firmly securing the optic. The inner lever 217 multiplies the mechanical advantage of the outer lever 215. The inner lever 217 bears against the removable plate with a rounded toe 219 that acts as a second cam, further enhancing the clamping force.

The payload platform assembly 110 is comprised of a lower base 111 that is coupled to the saddle 103 and an extendable upper section 112 which is attached to a rotation pivot guide 116 that allows the top section 113 to rotate up to 90 degrees from a horizontal landscape orientation to a vertical portrait orientation. The top section 113 has a clamping mechanism that is partially integral to the top section for securing top section 113 at a particular orientation about its pivot point, but also includes compound lever mechanism 115. The optical instrument 119 can be attached to the platform assembly 110 via the clamping mechanism 115 as previously described. The optical instrument 119 is attached to the "quickplate" or "dovetail plate" 118 (see FIG. 2), via a hole in the center of the plate, and a standard tapped hole that is on for example cameras and other mountable optical instruments. The clamping mechanism 115 clamps to the plate 118, not directly to the camera. The clamping mechanism 115 can be adjusted to the plate with the adjustment screw 114. Not all plates are the exact same width. Since there are different brands of plates, this can be adjusted to accommodate all dovetail plates or quick-plates 118. As will be appreciated, the center of mass of the optical instrument 119 remains centered to the payload platform 110 when the optical instrument 119 is rotated from the landscape to the portrait orientation or vice versa.

Figure 6:
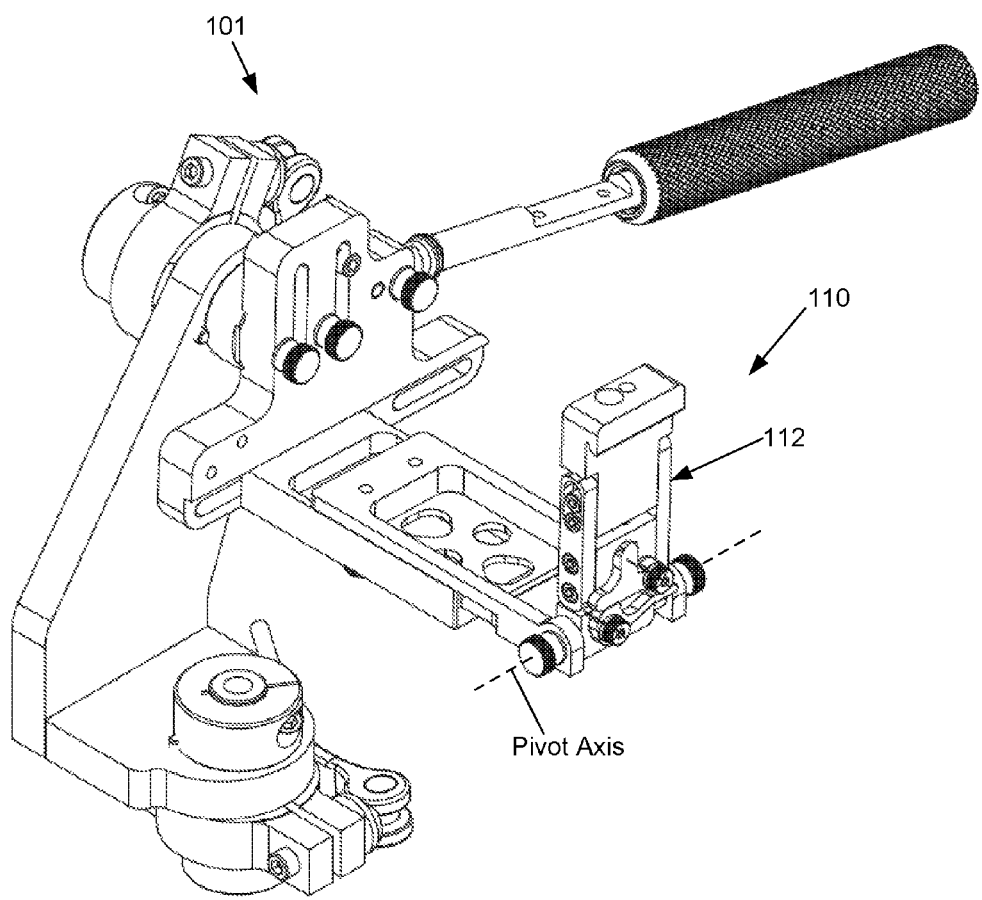
FIG. 6 is a perspective view of the optical mounting device of FIG. 2 with the platform actuated for rotation of a mounted optic.

Referring now also to FIG. 6 in the drawings, a perspective view of the optical mounting device 101 of FIG. 2 is illustrated with the platform actuated for rotation of a mounted optical instrument 119. As seen, top section 113 is rotated into a vertical alignment.

In particular with FIG. 2, device 101 also incorporates a guide-handle 117 for controlling the aiming and motions of the optical instrument without need for using the optical instrument itself as a lever, as required by other gimbal mounts. The guide-handle 117 is retractable which makes the mounting device selectively compact for transport and provides two stable configurations for guiding different devices. Also, the guide-handle 117 provides a docking point 221 on its shaft for the purpose of attaching a bracket to hold a smart-phone or GPS unit (not shown).

The current application has many advantages over the prior art including at least the following: (1) The quick-plate compound clamping lever provides a large range of motion for easy installation of the optical instrument, while also offering a large mechanical advantage for secure clamping; (2) The lever mechanism is mounted on a hinged platform that can be rotated 90 degrees; (3) The rotation forces about the 2 axes are equalized; (4) The payload platform assembly permits location adjustment of the optical instrument in both horizontal and vertical directions; and (5) There is drastically decreased flexure and vibration.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An optical mounting device, comprising:
 a yoke assembly;
 a saddle coupled to the yoke assembly, the yoke assembly configured to permit rotation of the saddle about a plurality of axes;
 a payload platform assembly coupled to a portion of the saddle, the payload platform assembly configured to partially pivot so as to permit positioning between a horizontal and an elevated orientation, the payload platform assembly configured to selectively couple to a mounting plate for attachment of an optical instrument; and
 a clamping mechanism in communication with the payload platform assembly and configured to secure a mounting plate, the clamping mechanism includes a compound lever configuration having an outer lever and an inner lever, selective motion of the outer lever produces varied amounts of movement of the inner lever depending on the position of the outer lever, the compound lever configuration being configured to secure the mounting plate to the payload platform assembly.

2. The device of claim 1, wherein the inner lever includes a rounded end to engage the mounting plate.

3. The device of claim 1, wherein the saddle is configured to permit the selective positioning of the payload platform assembly relative to the plurality of axes so as to be aligned axially with a vertical axis and a horizontal axis of rotation.

4. The device of claim 1, wherein the payload platform assembly is configured to secure the mounting plate, the mounting plate configured to releasably couple an optical instrument.

5. The device of claim 1, wherein the payload platform further includes a rotation pivot guide configured to selectively permit the pivoting of a portion of the payload platform assembly between the horizontal and the elevated orientation.

6. The device of claim 1, further comprising:
 a guide handle configured to control the aiming and motions of the yoke, the guide handle in communication with the yoke assembly.

7. The device of claim 6, wherein the guide handle includes a docking point for attachment of an electronic device.

8. The device of claim 6, wherein the guide handle is selectively positioned between a retracted position and an extended position.

9. The device of claim 1, wherein the yoke assembly includes a pair of friction collars configured to regulate the degree of movement about the plurality of axes.

10. The device of claim 1, wherein the yoke assembly includes a vertical axis and a horizontal axis of rotation, the yoke is canted backwards such that the vertical axis and the horizontal axis are offset.

11. The device of claim 10, wherein the canted form of the yoke positions the saddle and payload platform partially behind the vertical axis so as to create additional space as the saddle is rotated about the horizontal axis.

* * * * *